(12) United States Patent
Kroll et al.

(10) Patent No.: US 10,724,855 B2
(45) Date of Patent: Jul. 28, 2020

(54) MOTOR VEHICLE ALIGNMENT TECHNOLOGY

(71) Applicants: William P. Kroll, Medina, MN (US); Kai Kroll, Plymouth, MN (US); Steven McBroom, Medina, MN (US)

(72) Inventors: William P. Kroll, Medina, MN (US); Kai Kroll, Plymouth, MN (US); Steven McBroom, Medina, MN (US)

(73) Assignee: Intercomp Company, Medina, MN (US)

( * ) Notice: Subject to any disclaimer, the term of this patent is extended or adjusted under 35 U.S.C. 154(b) by 0 days.

(21) Appl. No.: 15/800,160

(22) Filed: Nov. 1, 2017

(65) Prior Publication Data

US 2018/0321029 A1 Nov. 8, 2018

Related U.S. Application Data

(60) Provisional application No. 62/415,930, filed on Nov. 1, 2016.

(51) Int. Cl.
*G01B 11/275* (2006.01)

(52) U.S. Cl.
CPC ...... *G01B 11/2755* (2013.01); *G01B 2210/28* (2013.01)

(58) Field of Classification Search
CPC .................................................. G01B 11/2755
See application file for complete search history.

(56) References Cited

U.S. PATENT DOCUMENTS

| D399,144 | S | * | 10/1998 | Kroll | .............................. D10/65 |
| 2008/0119978 | A1 | * | 5/2008 | Stieff | ................. G01B 11/2755 701/31.4 |
| 2009/0031782 | A1 | * | 2/2009 | Jackson | ............. G01B 11/2755 73/1.75 |
| 2013/0239420 | A1 | * | 9/2013 | Kroll | .................... G01B 11/275 33/228 |
| 2014/0111645 | A1 | * | 4/2014 | Shylanski | .......... G01B 11/2755 348/148 |

* cited by examiner

*Primary Examiner* — Shawn Decenzo
(74) *Attorney, Agent, or Firm* — Skinner and Associates; Joel D. Skinner, Jr.

(57) ABSTRACT

An alignment system for aligning the wheels of a vehicle. The alignment system measures caster and camber of the front wheels of the vehicle. The system includes four alignment heads, each alignment head having a laser, a target, and a transmitter/receiver. A rim clamp communicatively couples each alignment head to the wheel of the vehicle. A turn plates is positioned below each front wheel of the vehicle.

3 Claims, 19 Drawing Sheets

MOTOR VEHICLE ALIGNMENT TECHNOLOGY

CROSS-REFERENCE TO RELATED APPLICATIONS, IF ANY

This application claims the benefit under 35 U.S.C. § 119(e) of co-pending U.S. Provisional Patent Application Ser. No. 62/415,930, filed Nov. 1, 2016, which is hereby incorporated by reference.

37 C.F.R. § 1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to motor vehicle and motor vehicle maintenance systems, apparatus and methods. Particularly, the invention relates to a wheel alignment system for motor vehicles such as automobiles, trucks, vans and the like.

2. Background Information

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a motor vehicle wheel alignment system, apparatus and methods of use and manufacture therefor which are practical, reliable, accurate and efficient, and which are believed to fulfill the need and to constitute an improvement over the background technology.

In one aspect the invention provides an alignment system for measuring caster and camber of the front wheels of a vehicle, including:
 a. four alignment heads, each alignment head having a laser, a target, and a transmitter/receiver;
 b. a rim clamp for communicatively coupling each alignment head to the wheel of the vehicle; and
 c. two turn plates, each turn plate adapted to be positioned below a front wheel of the vehicle.

The aspects, features, advantages, benefits and objects of the invention will become clear to those skilled in the art by reference to the following description, claims and drawings.

DETAILED DESCRIPTION

This invention provides an alignment system for aligning two or four wheels of a vehicle, such as an automobile, truck, van or the like. The system works in a variety of service environments including a drive-on alignment rack, twin post lift or garage floor. The system is useable to perform a variety of tasks, including but not limited to measuring and recording before and after measurements, automatically calculating camber, recording caster and tow, and calculating thrust angle. The system displays and records measurements in fraction and decimal form, create and save records, and print and export such records.

Figure 1:
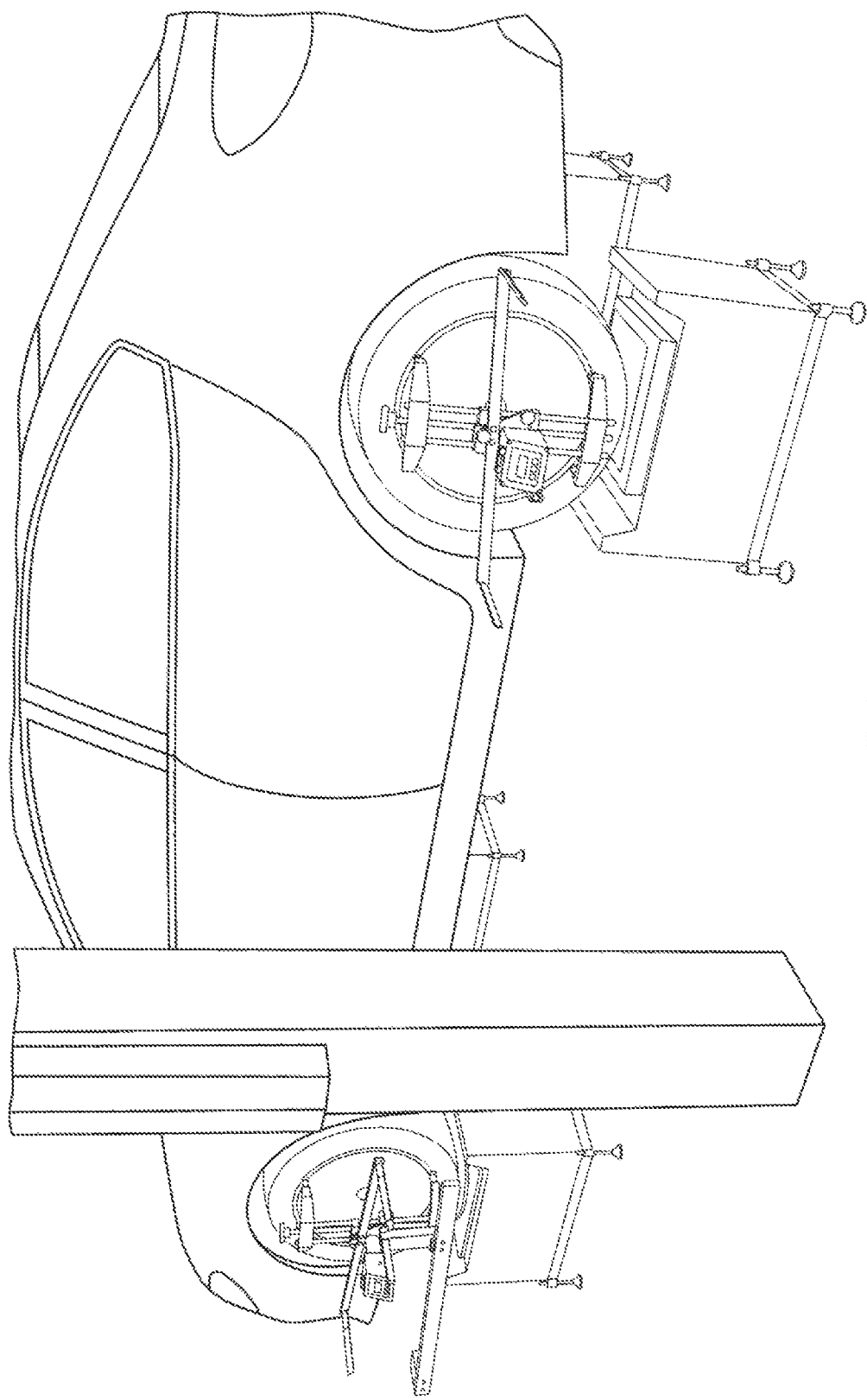
FIG. 1 shows an embodiment of the motor vehicle wheel alignment system of the present invention.
Figure 2:
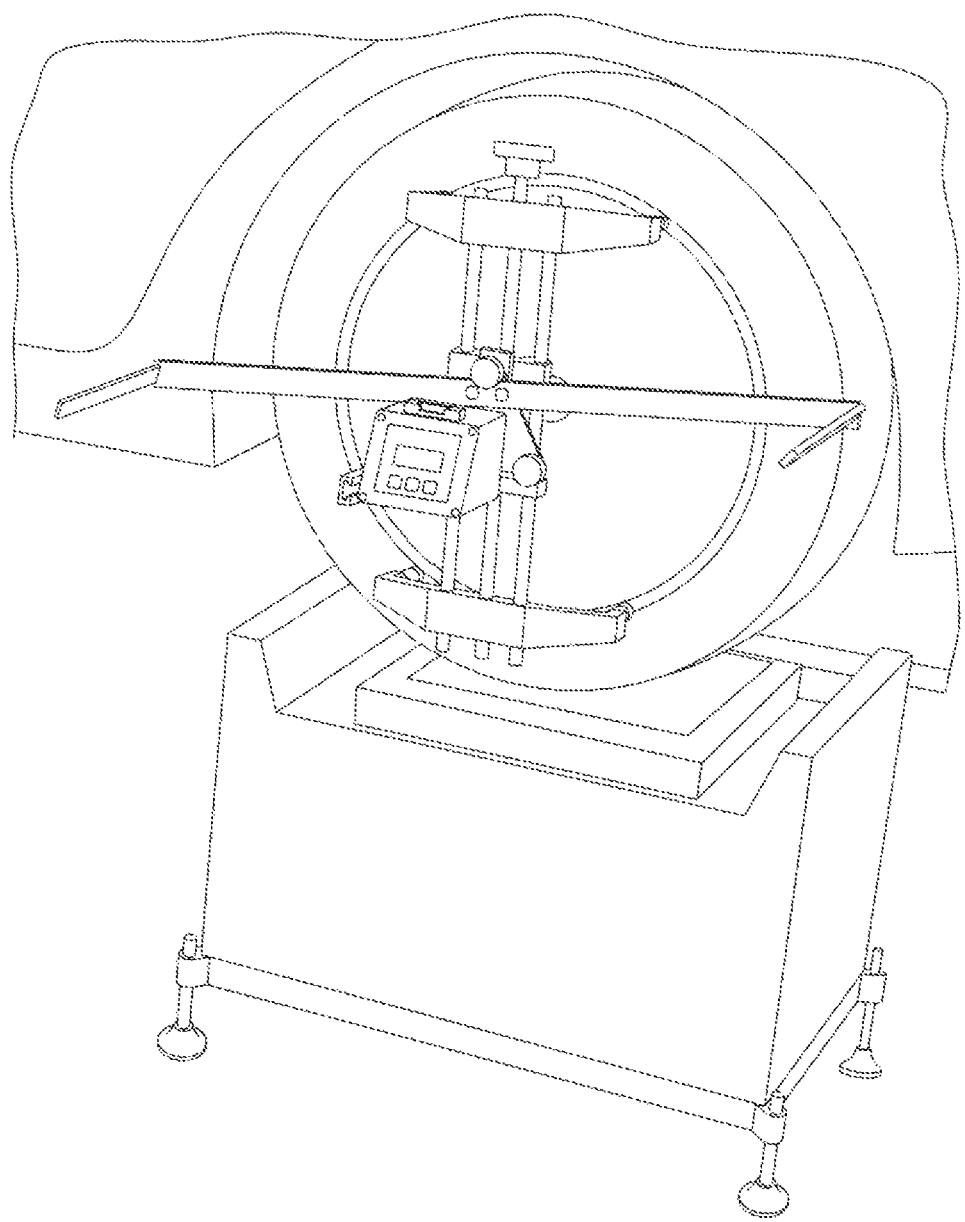
FIG. 2 is perspective view of a portion of the system coupled to a rear wheel of a vehicle.
Figure 3:
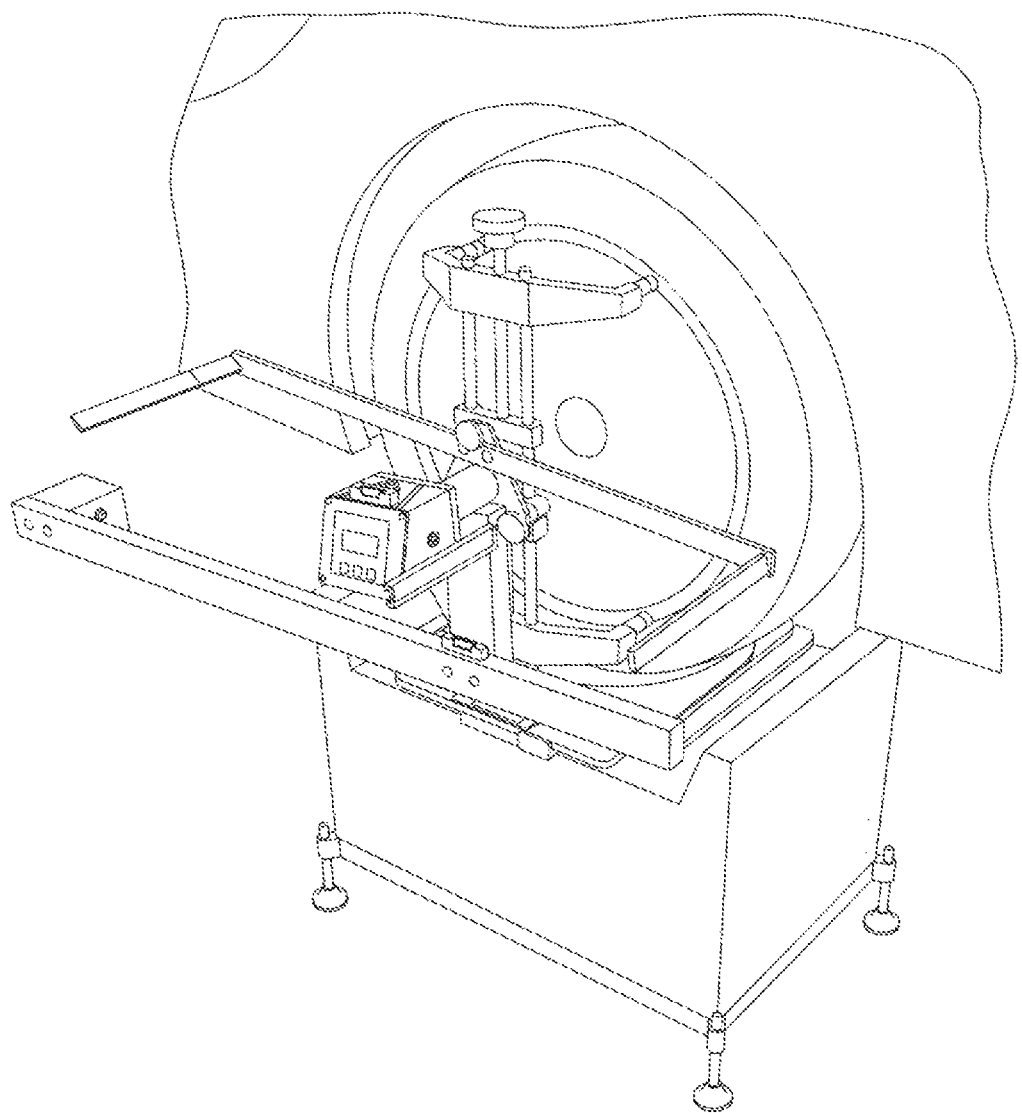
FIG. 3 is perspective view of a portion of the system coupled to a front wheel of a vehicle.
Figure 4:
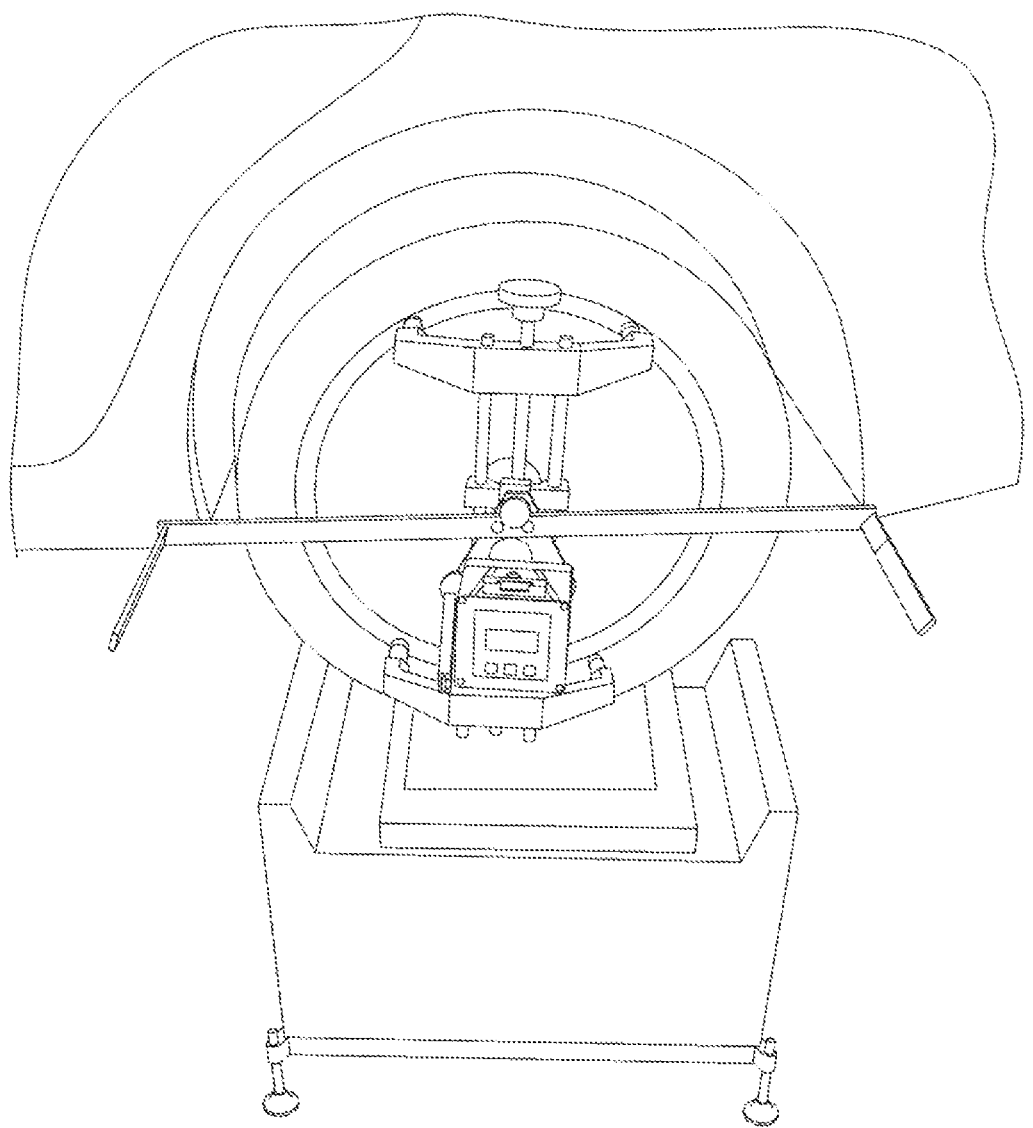
FIG. 4 is a front view of the portion of FIG. 2.
Figure 5:
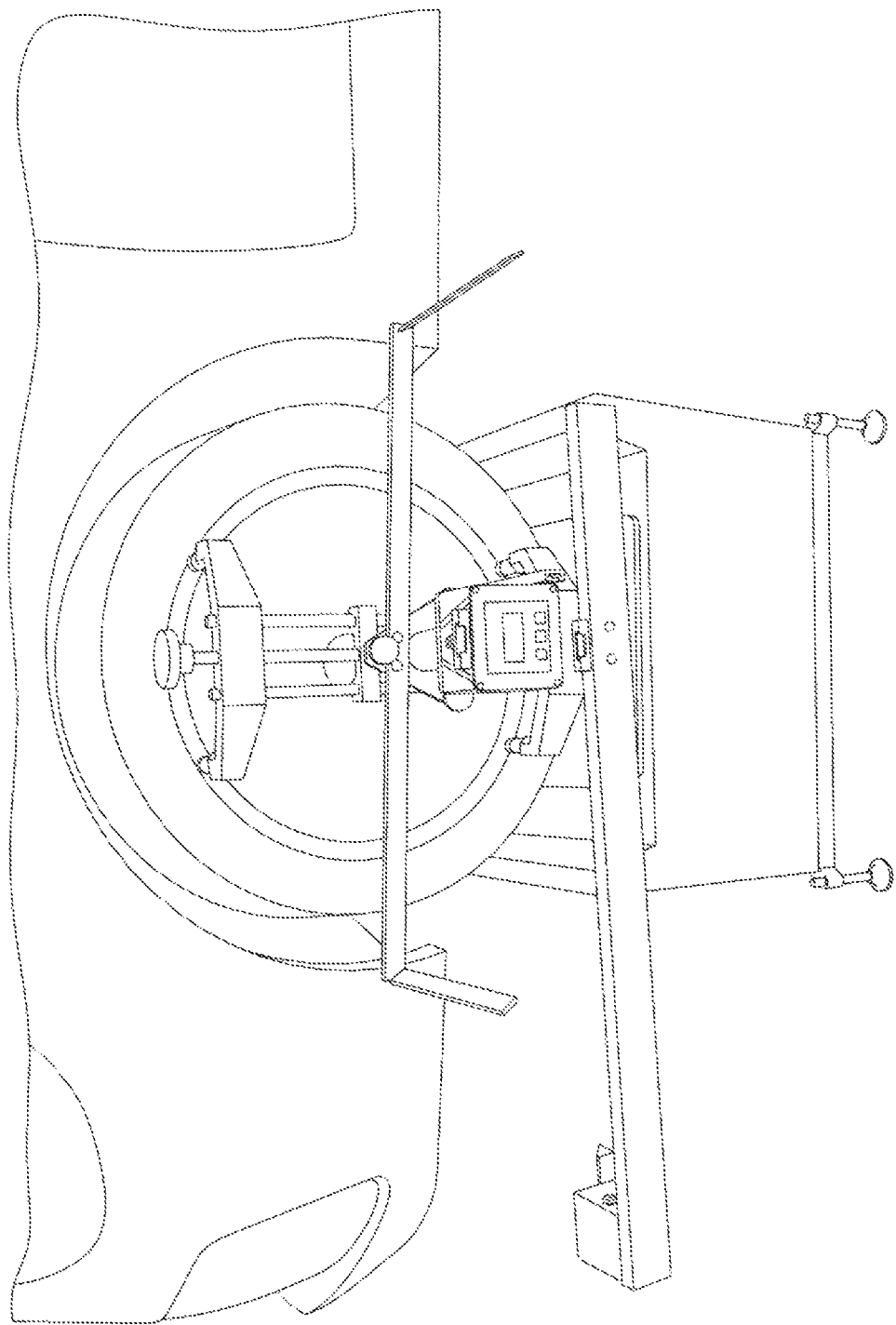
FIG. 5 is a front view of the portion of FIG. 3.
Figure 6:
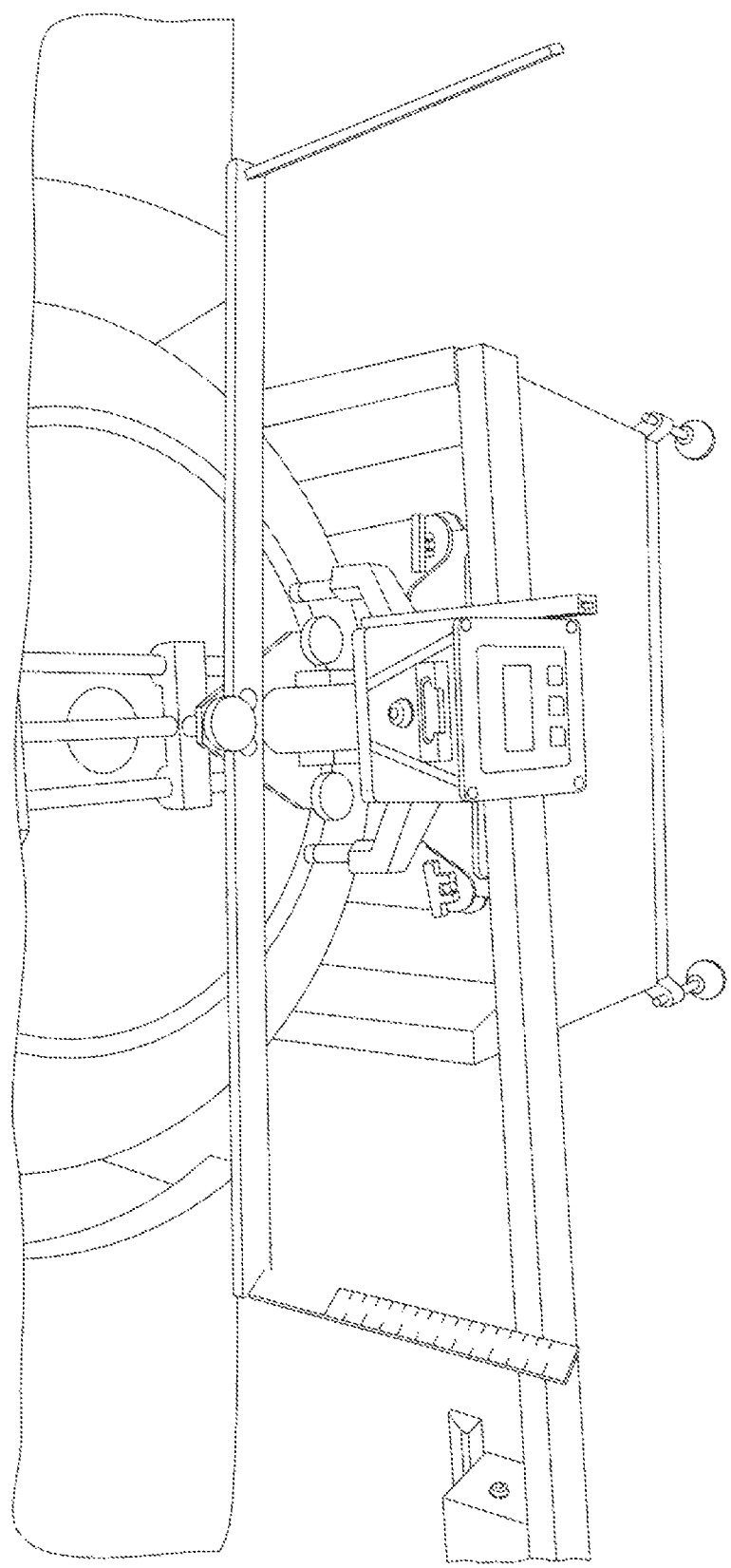
FIG. 6 is top view of the portion of FIGS. 3 and 5.
Figure 7:
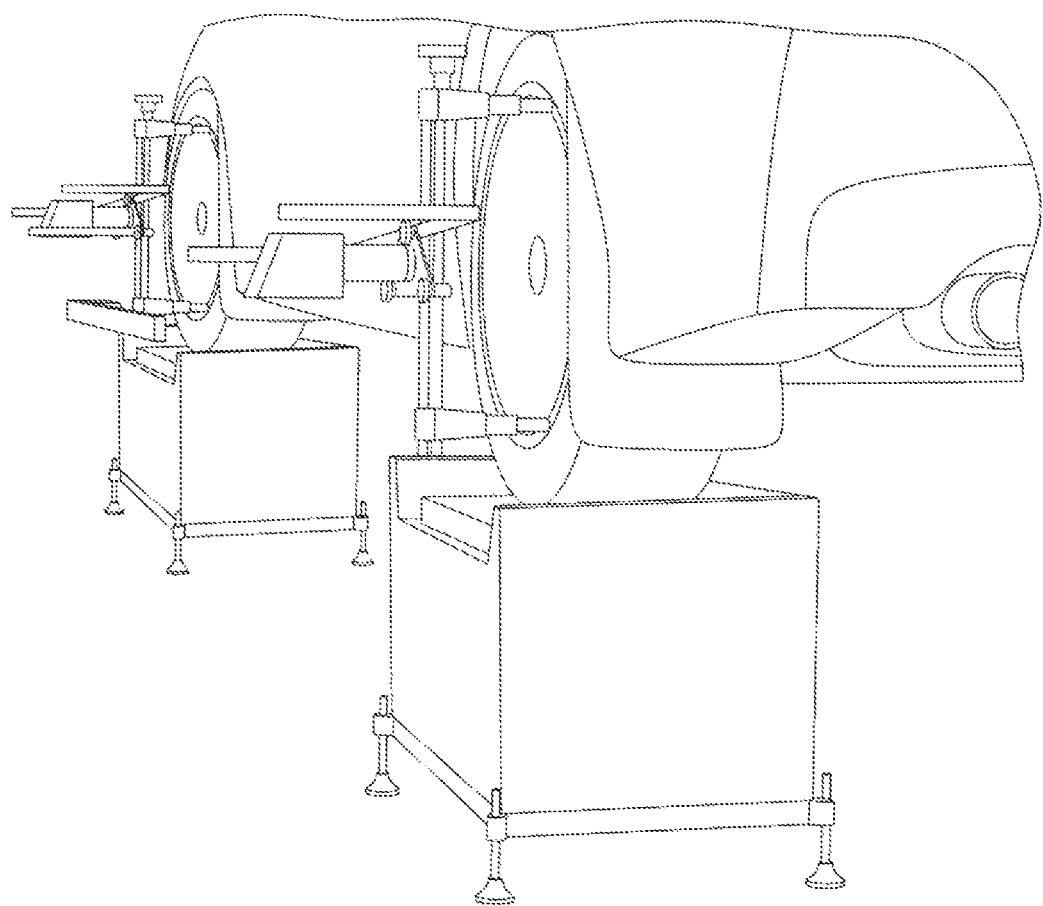
FIG. 7 is a rear view of the system coupled to a vehicle.
Figure 8:
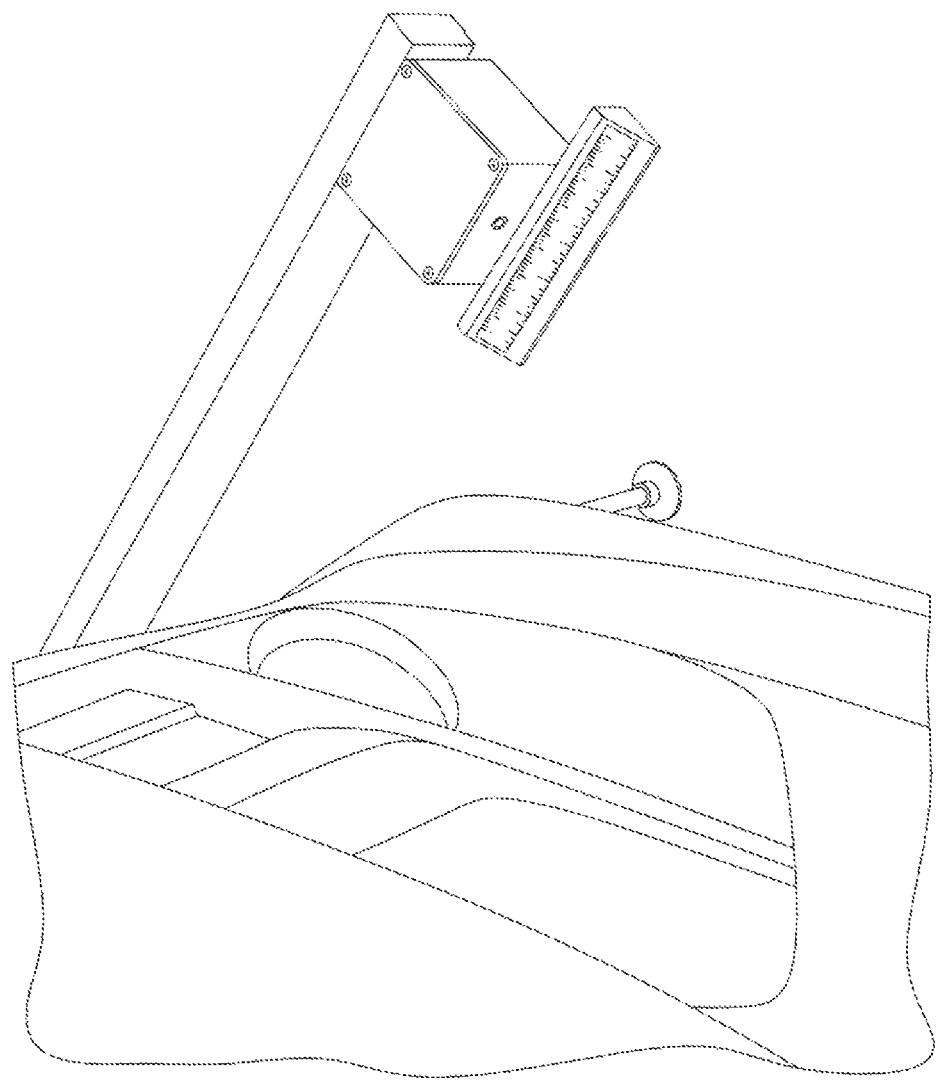
FIG. 8 is a view of an element of the system.
Figure 9:
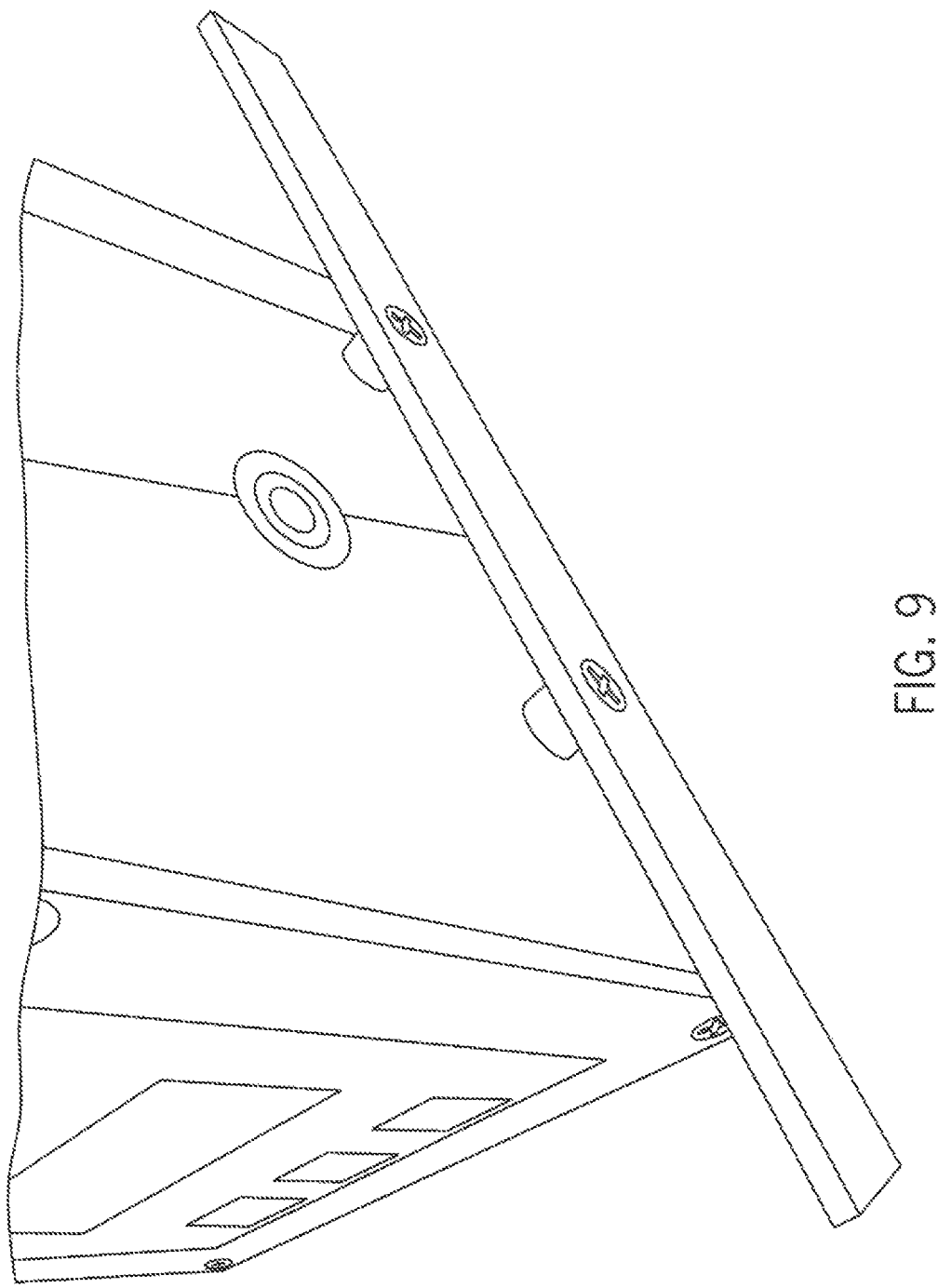
FIG. 9 is a view of a portion of the alignment head controller of the system.
Figure 10:
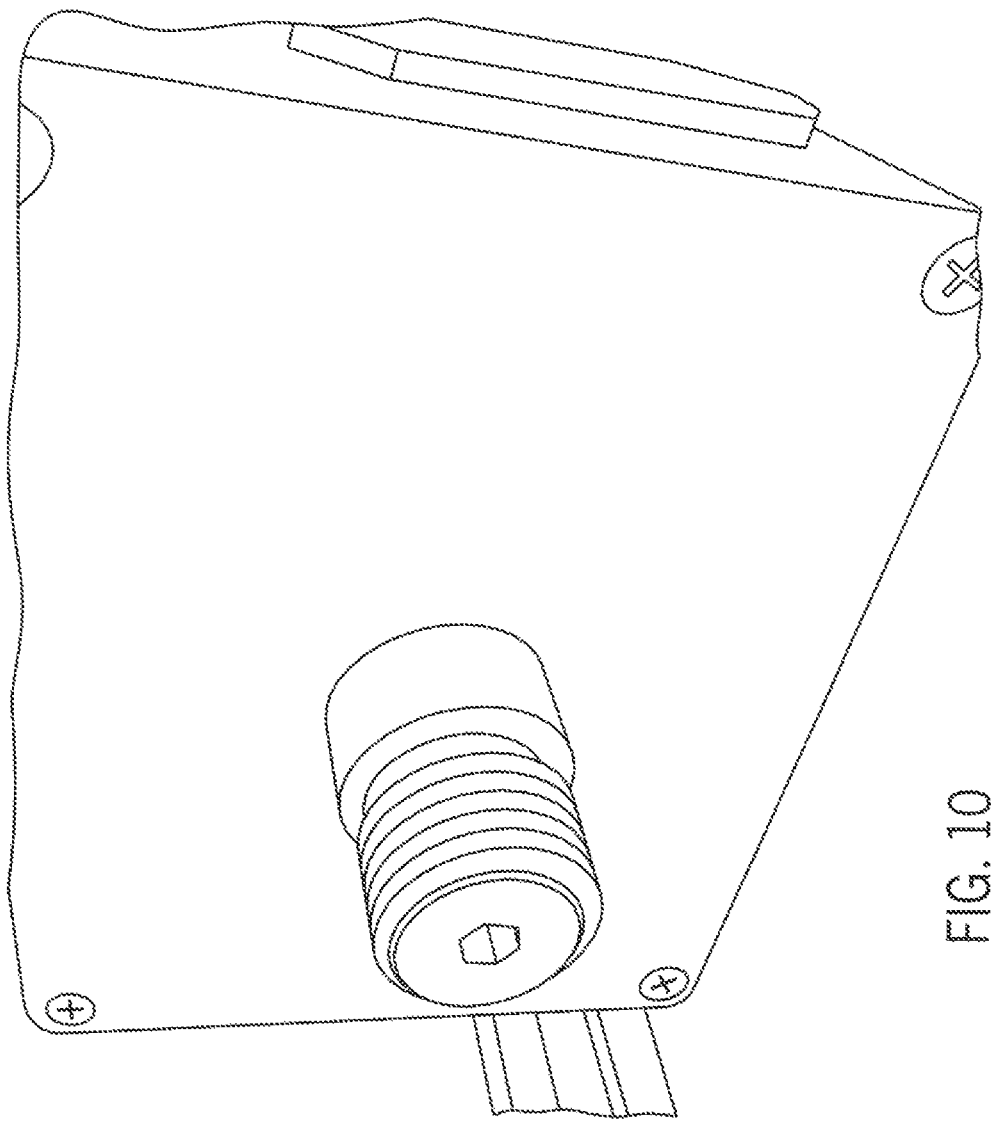
FIG. 10 is a view of another portion of the controller.
Figure 11:
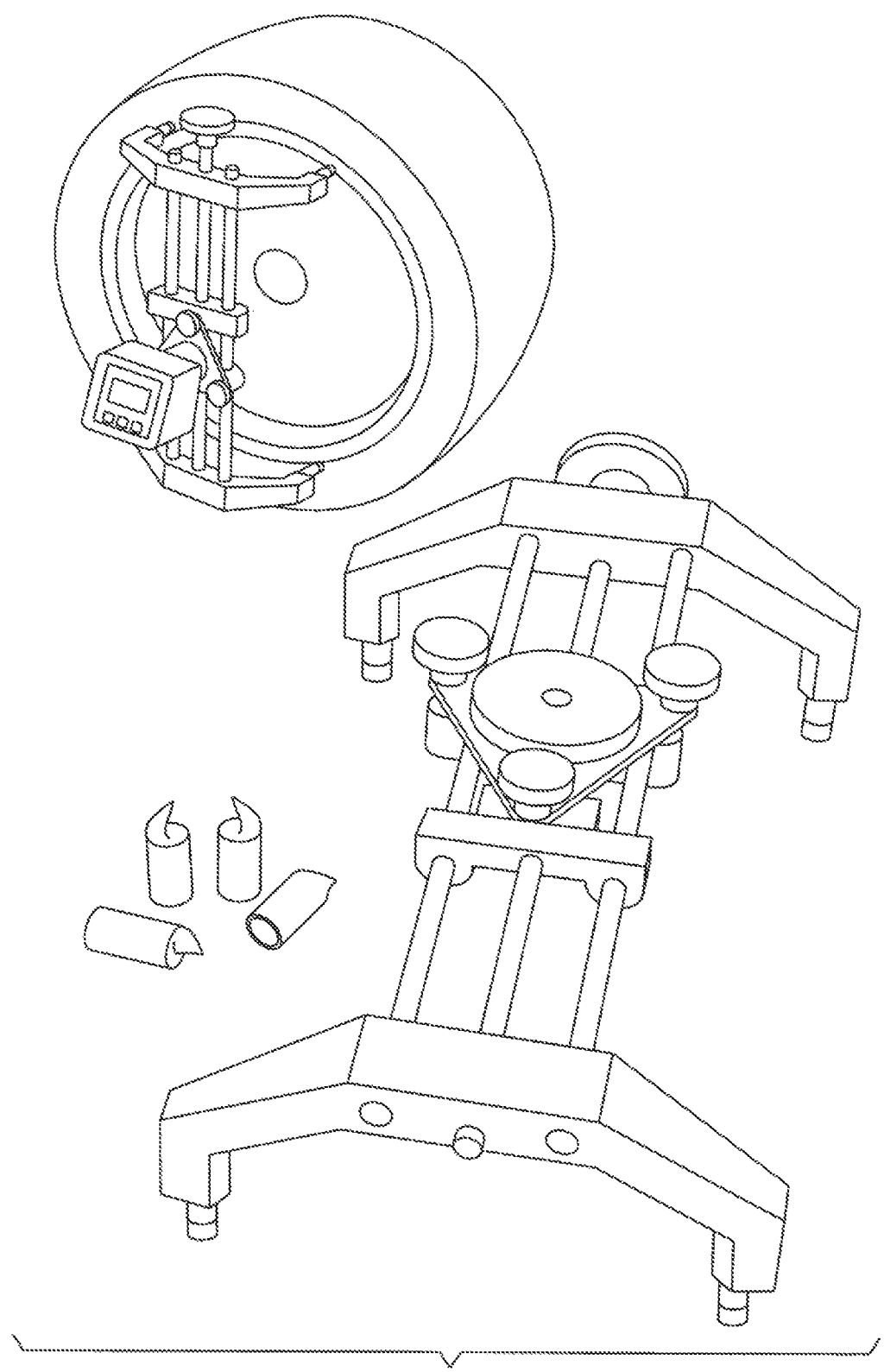
FIG. 11 shows an embodiment of a rim clamp of the system, both coupled and uncoupled to a vehicle wheel.
Figure 12:
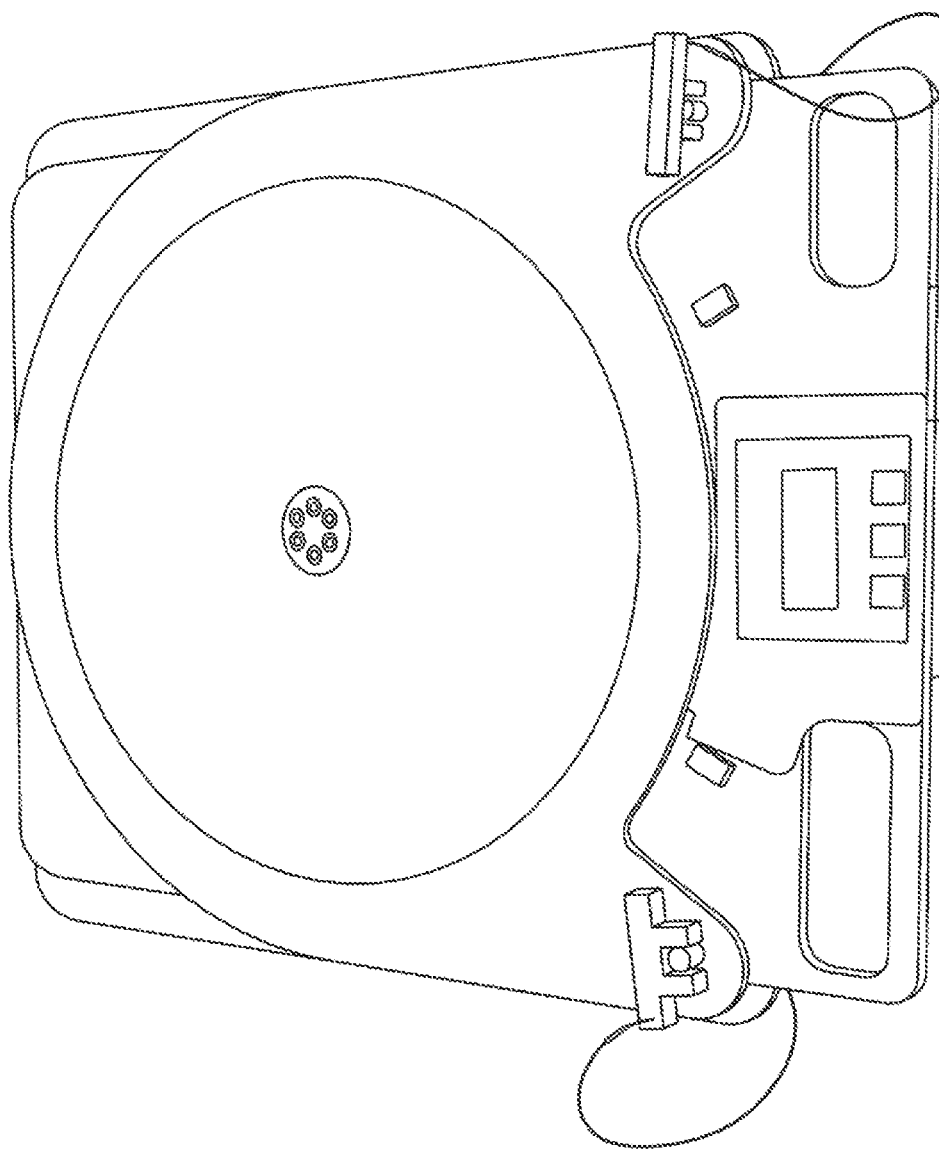
FIG. 12 shows an embodiment of a turn plate of the system.

FIGS. 1-8 shows an embodiment of the vehicle wheel alignment system of the present invention.
FIGS. 9 and 10 show portions of the alignment head controller of the system.
FIG. 11 shows an embodiment of a rim clamp of the system, both coupled and uncoupled to a vehicle wheel.
FIG. 12 shows an embodiment of a turn plate of the system.

Figure 13:
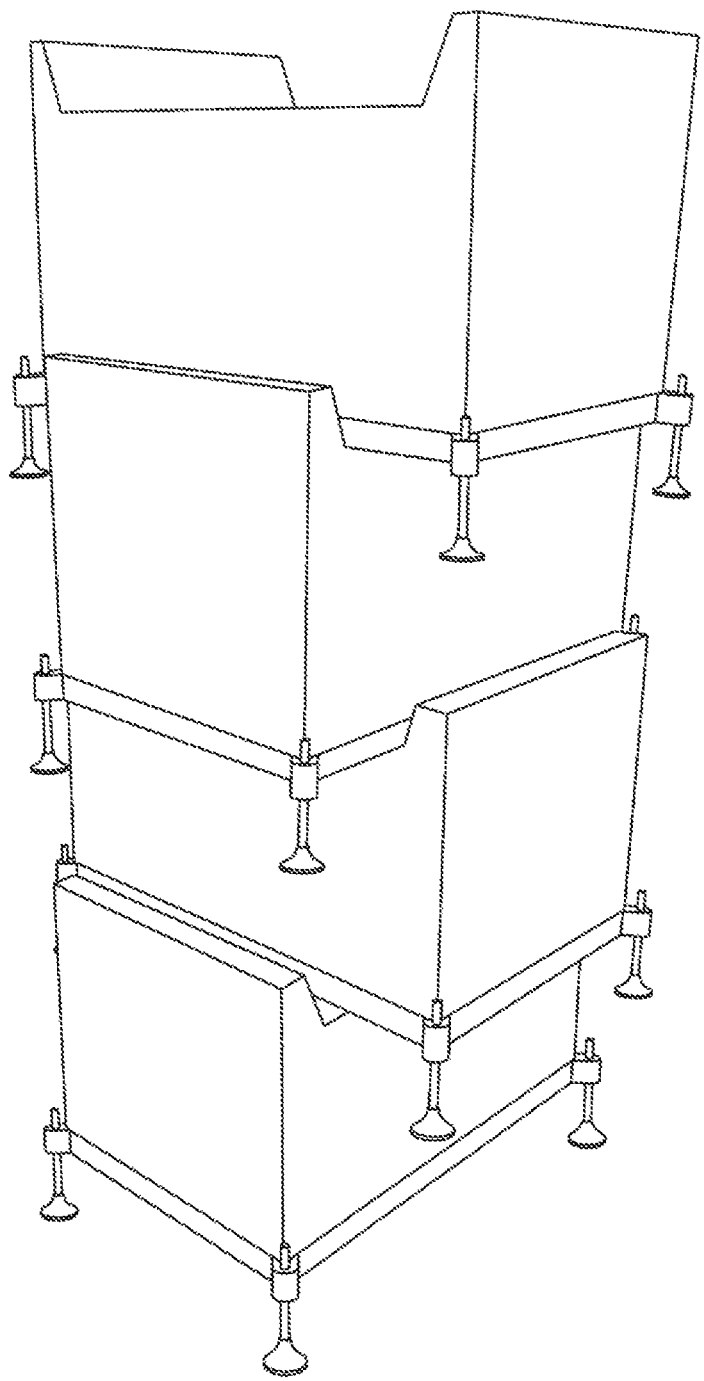
FIG. 13 shows an embodiment of an optional set of levelers of the system.

FIG. 13 shows an embodiment of an optional set of levelers of the system.

Figure 14:
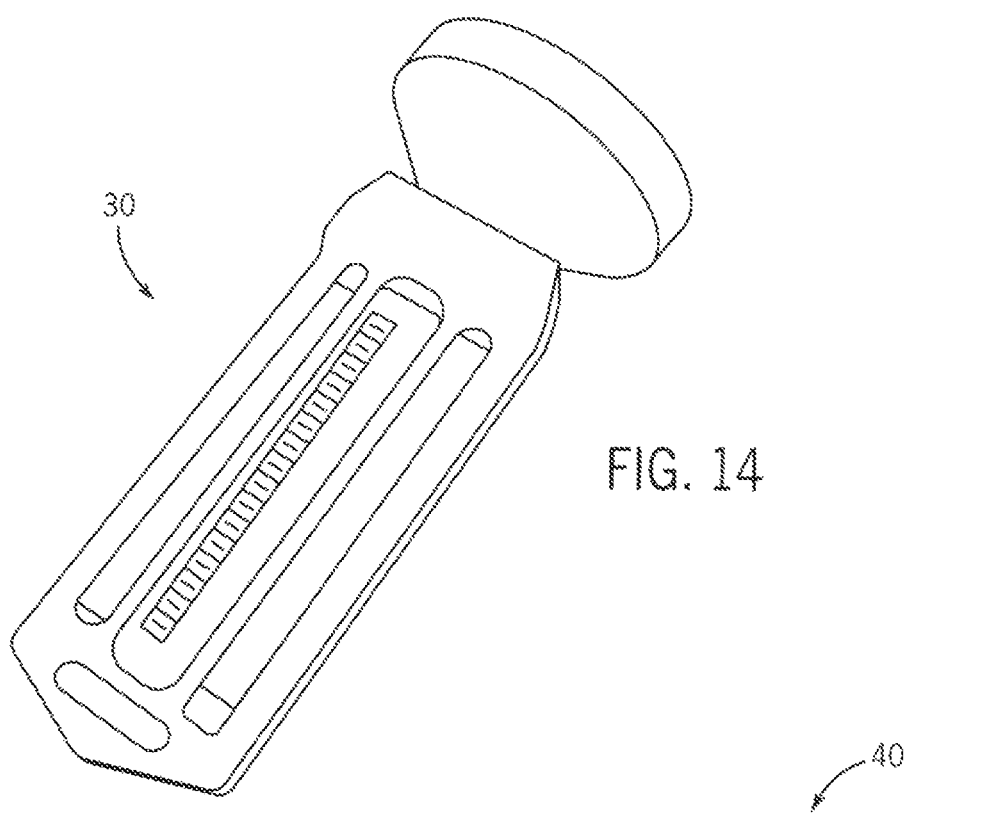
FIG. 14 shows an embodiment of a Caster-Camber Gauge of the system.

FIG. 14 shows an embodiment of a Caster-Camber Gauge of the system.

Figure 15:
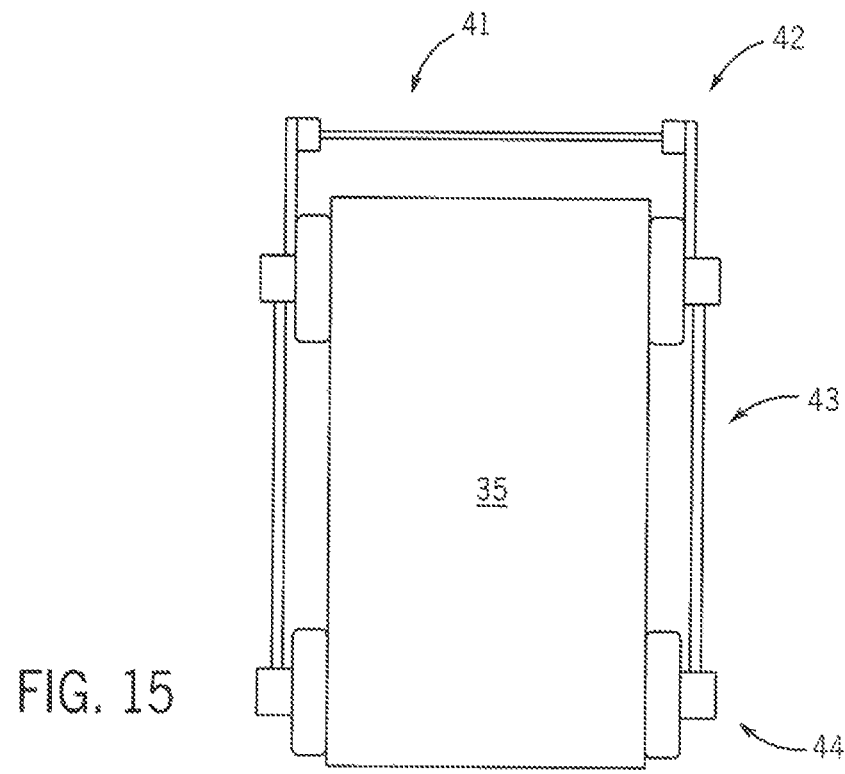
FIG. 15 is a diagram showing the arrangement of the system components for a vehicle, and for a method of use of the system.

FIG. 15 is a diagram showing the arrangement of the system components for a vehicle, and for a method of use of the system.

Figure 16:
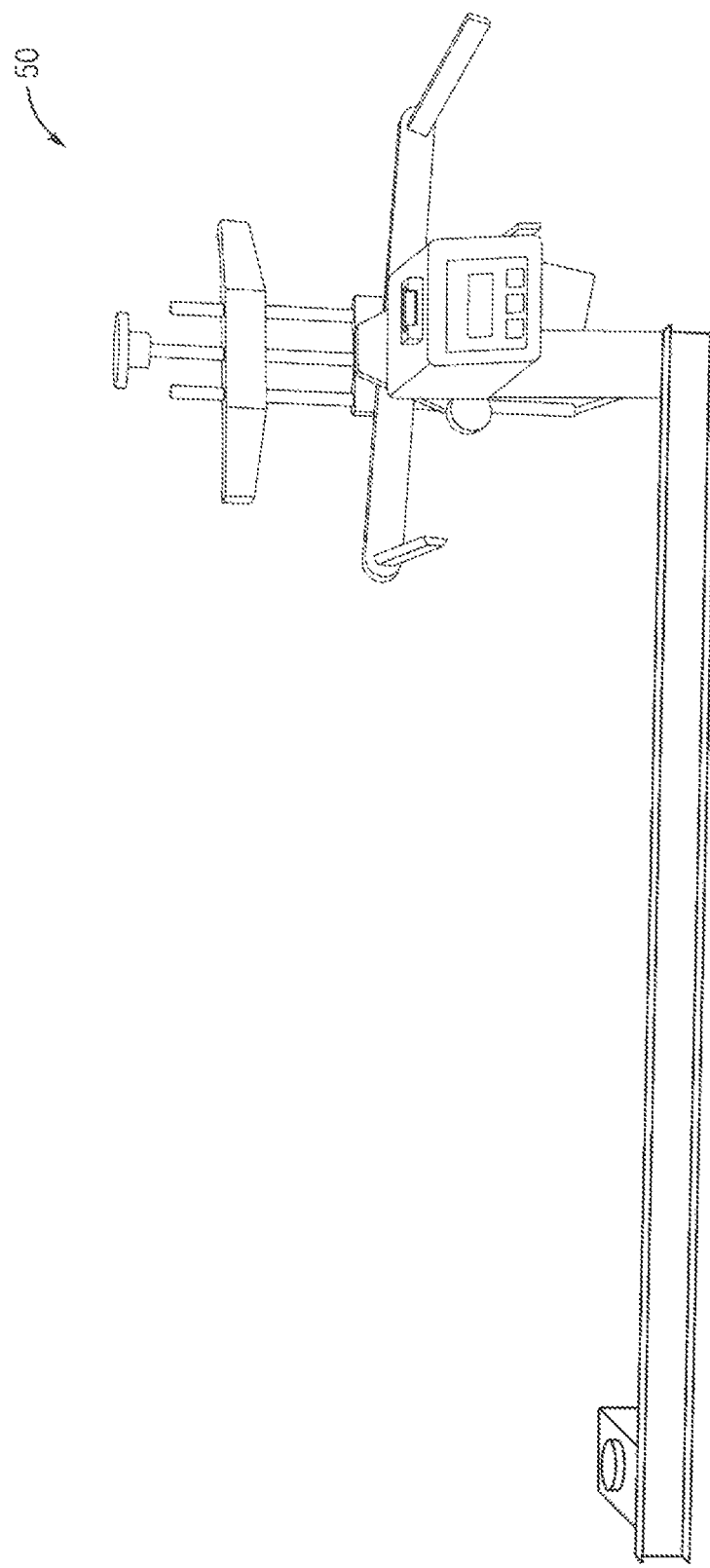
FIG. 16 is a front view of an embodiment of an alignment head and track width laser assembly of the system.

FIG. 16 is a front view of an embodiment of an alignment head and track width laser assembly of the system.

Figure 17:
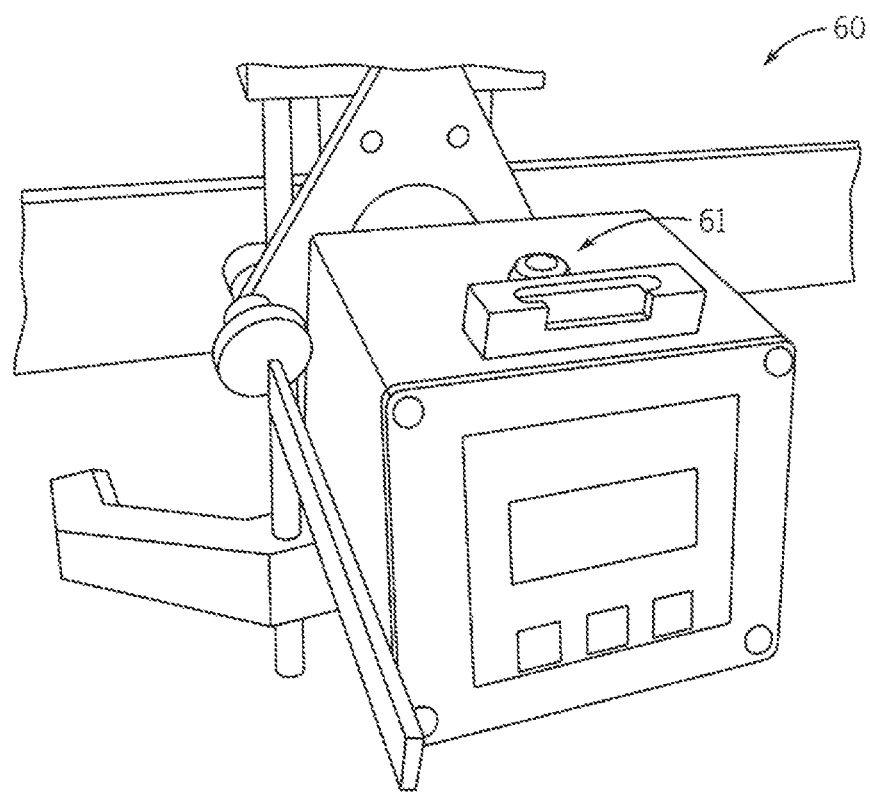
FIG. 17 shows an embodiment of an alignment head of the system.
Figure 18:
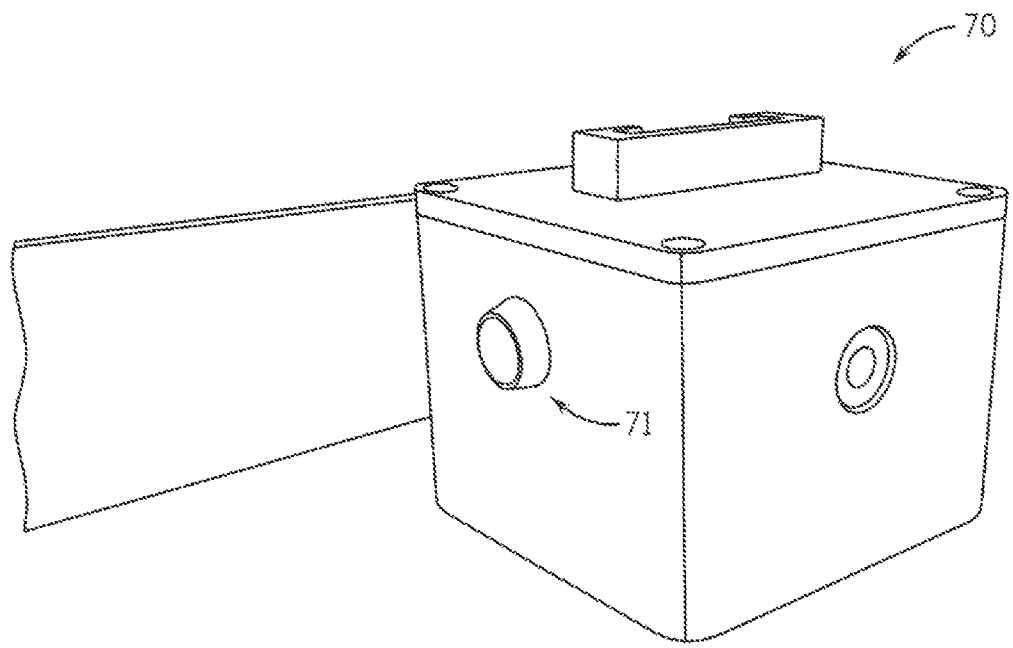
FIG. 18 shows an embodiment of a track witch laser of the system.
Figure 19:
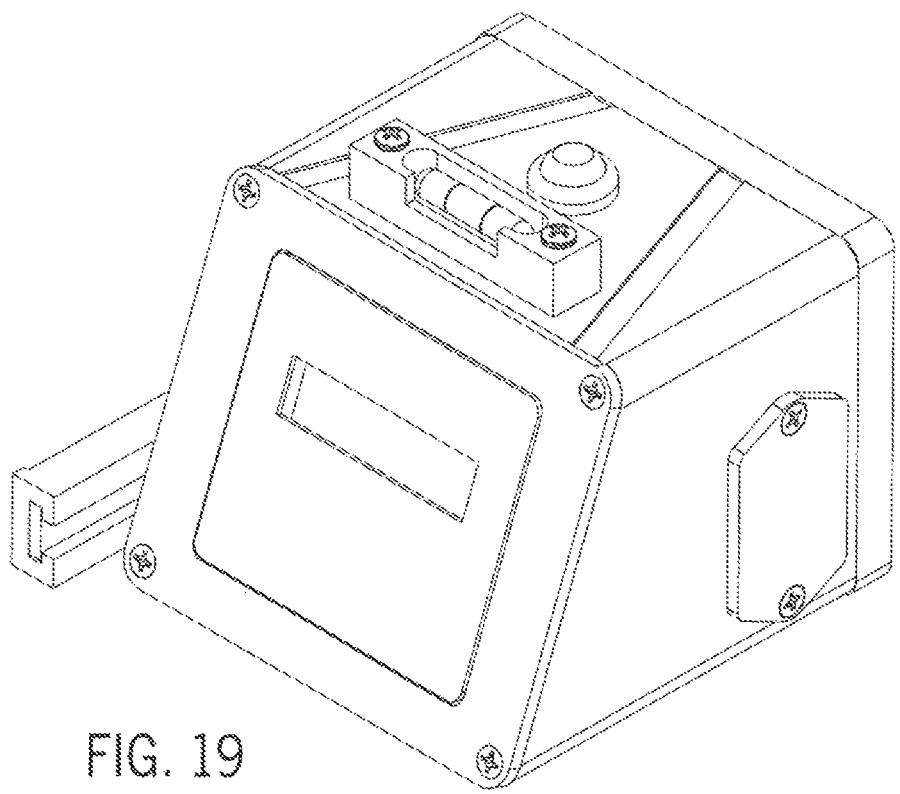
FIG. 19 is a perspective view of the alignment head of FIG. 17.
Figure 20:
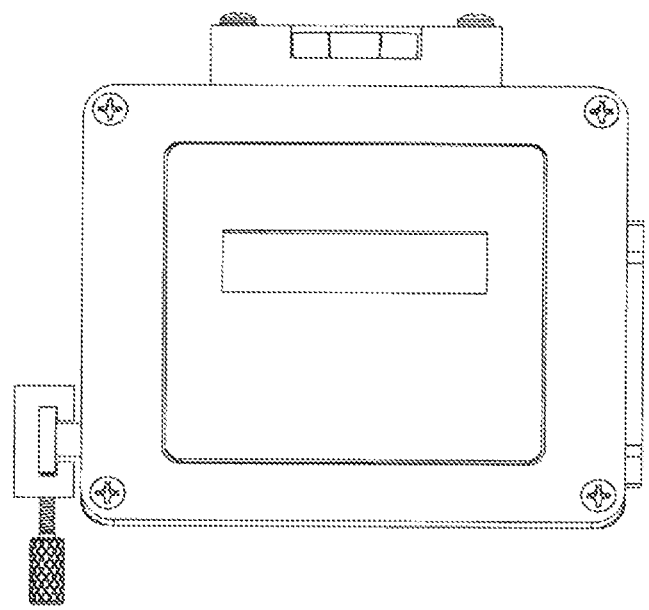
FIG. 20 is a front view of the alignment head.
Figure 21:
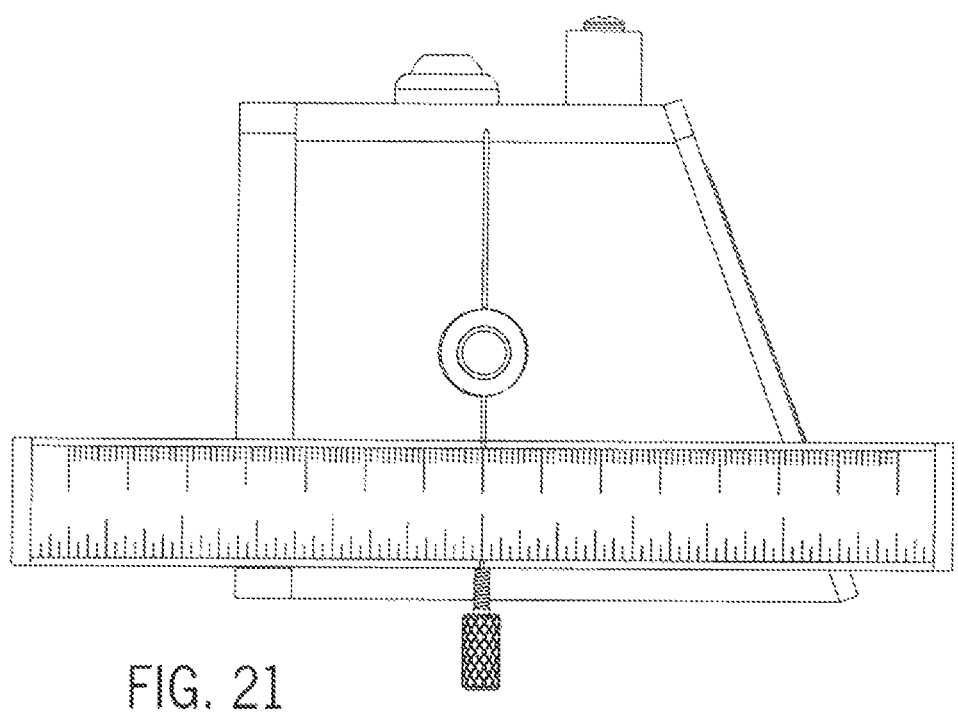
FIG. 21 is a side view of the alignment head.
Figure 22:
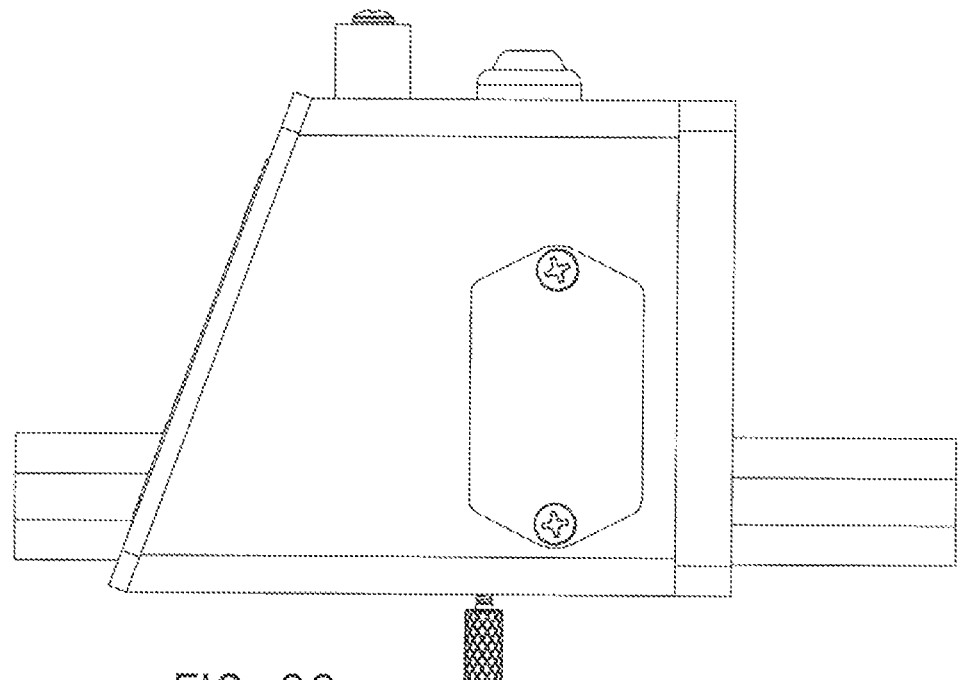
FIG. 22 is an opposite side view of the alignment head.

FIG. 17 shows an embodiment of an alignment head of the system. FIG. 18 shows an embodiment of a track witch laser of the system.

FIGS. 19-22 further show the alignment head of FIG. 17.

Figure 23:
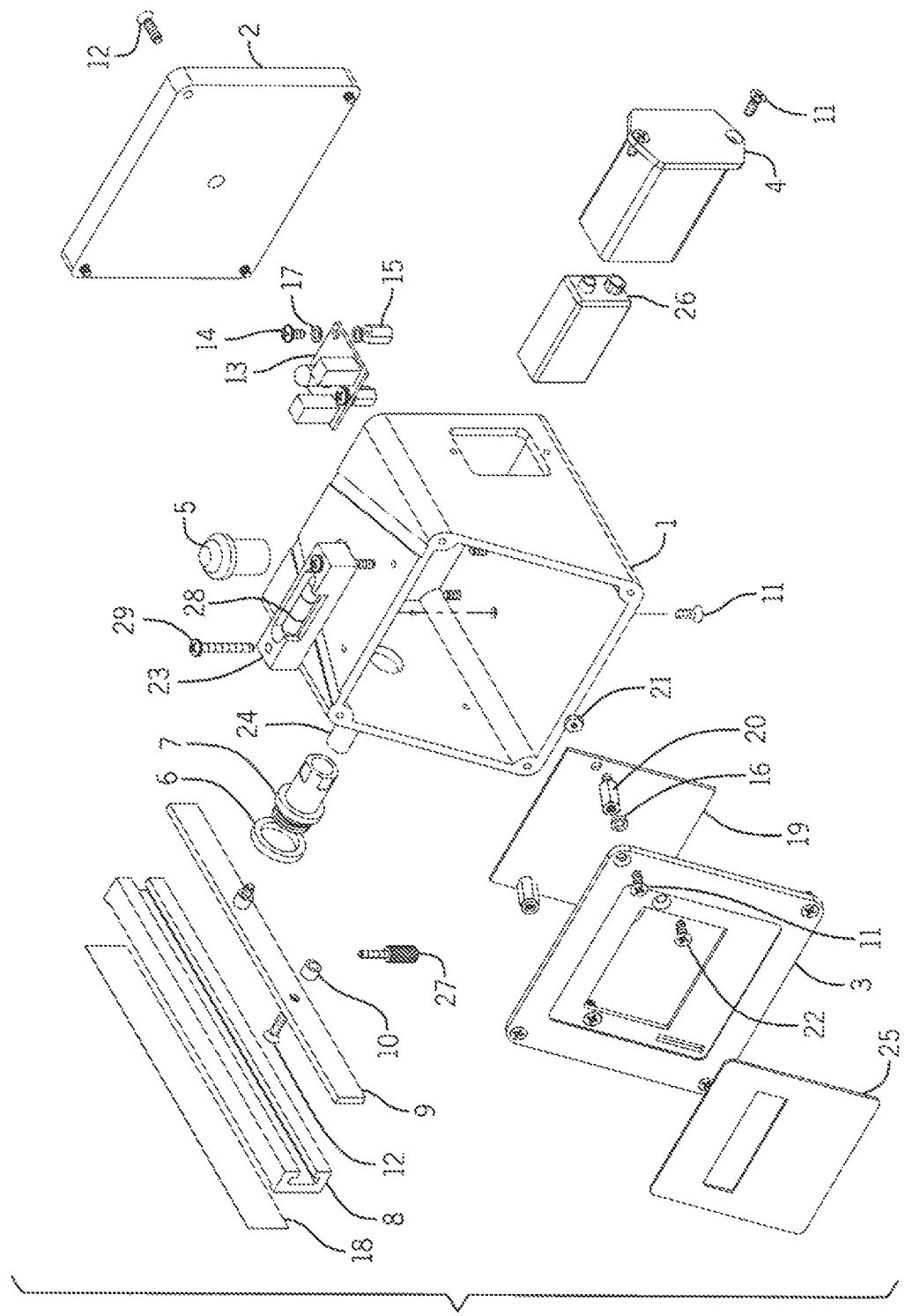
FIG. 23 is an exploded view of the alignment head.

FIG. 23 is an exploded view of the alignment head. In the embodiment of FIG. 23, the following parts list applies:

| Number | Element |
| --- | --- |
| 1 | digital gauge housing with laser right side |
| 2 | gauge rear mounting plate |
| 3 | display end plate |
| 4 | push button switch |
| 5 | laser housing spacer |
| 6 | laser housing |
| 7 | ruler for caster/camber gauge with laser |
| 8 | adjustable track width ruler mount |
| 9 | spacer screw |
| 10 | screw |
| 11 | screw |
| 12 | screw |
| 13 | AC 3060 tilt sensor |
| 14 | screw |
| 15 | standoff |
| 16 | nylon washer screw |
| 17 | thick nylon washer |
| 18 | alignment system laser ruler sticker |
| 19 | circuit board |
| 20 | standoff |
| 21 | nut |
| 22 | screw |
| 23 | bubble caster camber gauge |
| 24 | alignment system laser |
| 25 | caster camber overlay |
| 26 | battery - 9V alkaline |
| 27 | adjuster |
| 28 | level vial - fluorescent |
| 29 | screw |

Overview

The Alignment System provides the precision of laser alignments without the cost or space of a full alignment rack. It features industrial-grade components that are not only durable, but also compact, allowing for optimized bay usage when alignments are not being done. This system is the ideal solution for automotive service users who seek to add alignment services without having to sacrifice the space and budget for the full alignment rack.

The Alignment System includes software and wireless communication between Alignment Gauges and the AS™ Series Software. Referring to FIGS. 1, 4, 16, 17, and 18, the alignment system includes:

Four (4) Alignment Heads which measure caster/camber and include integrated lasers, targets, and radios;

Four (4) Rim Clamps;

Two (2) Digital Turn Plate with integrated radios;

Two (2) Turn Place Spacers;

One (1) Tape Measure; and

One (1) Wireless Node and AS™ Series Software.

Specifications

Alignment Gauge
Controls
  Keypad: On/Off
  Caster/Camber display select.
  Caster zero set
  Push button switch Laser power on/off
  Display: 4 digit, 0.5" LCD
Electrical
  Batteries: 9V alkaline or rechargeable (NiMH) batter.
  Battery Life (AS2000): With laser on and Alignment Gauge on (no radio): 25 hours
  With laser off and Alignment Gauge on (no radio): 1000 hours
  Battery Life (AS3000): With laser on and Alignment Gauge on, plus radio: 20 hours
  With laser off and Alignment Gauge on, plus radio: 200 hours
Performance
  Display Range: ±20° in chamber mode
  ±30° in caster mode
  Wheel sweep: 30° or 40° total (selectable function)
  Caster zero range: Full zero range
  Resolution: 0.1°
  Accuracy (0 to ±16°): ±0.1°
  Accuracy (above ±16°): Monotonic
  Laser accuracy: Beam width=$\frac{1}{16}$" within the range of 12" to 144".
Environmental
  Humidity: 10 to 95% Non-Condensing.
  Ambient Temperature: Operating: −10° C. to ±45° C./+14° F. to 113° F.
  Storage: −40° C. to ±75° C./−40° F. to +167° F.
  Air Pressure Temp: −10° C. to +65° C./+14° F. to +149° F.
Radio
  Radio frequency ISM 2.4 GHz, 802.15.4
  License requirements None. Pre-approved US/FCC, CAN/IC, EUR/CE
  Range 200'/60 m indoor, 300'/90 m line of sight
Track Width Laser
Controls
  Push button On/Off Turns on the laser
Electrical
  Batteries: 3 AA size disposable alkaline batteries.
  Battery Life: 120 hours with alkaline batteries
Performance
  Accuracy: Beam width=$\frac{1}{16}$" within the range of 12" to 144".
Environmental
  Temperature: Operating: +10 C to +40 C./+50 F to +104 F.
  Storage: −20 C to +65 C./−4 F to +149 F.
Digital Turn Plate
Controls
  General: Zero, On/Off, Backlight
  Display: 4 digit, 0.5" LCD character
Electrical
  Batteries: 1 (9-volt) size alkaline recommended.
  Resolution: 24 bit A/D delivers over 16,000,000 internal counts
  Battery life: 1000 hours of continuous use with an alkaline battery. Use of backlight with reduce battery life Low batter indication: Flashes 'L.bAt' when battery is running low; Automatically turns off when battery power is low enough to affect reliability.

Performance

Accuracy: ±0.5% of reading or ±0.1°, whichever is greater

Range: 0-30° each direction

Environmental

Humidity: 10 to 95% Non-Condensing

Temperature: Operating: −10 C to +40 C./+15 F to +105 F

Storage: 40 C to +75 C./−40 F to +170 F

Physical

Dimensions: Base: 17"×15"×1.6"/43 cm ×38 cm×4.0 cm

Weight: 18.5 lb/8.5 kg

Radio

Radio frequency ISM 2.4 GHz, 802.15.4

License requirements None. Pre-approved US/FCC, CAN/IC, EUR/CE

Range 200"/60 m indoor, 300'/90 m line of sight

Operation of Alignment System

Referring to FIG. 15, step by step operation of the alignment system is as follows.

1. Mount front rim clamps. Ensure rim clamp is mounted level by using the bubble leveler on the track width arm.
2. Mount rear rim clamps vertical on the rear wheels.
3. Open Alignment Software and click file, "New Alignment".
4. Enter the VIN, Customer Name, and Repair Order.
5. Search for the vehicle's alignment specifications using the year, make, and model or by entering the VIN and then click "Find Specs"
6. If the vehicle uses custom specs that are not given by the software, then click "Create Custom Specs", enter in the data and click "Create Specs"
7. Turn on the front alignment heads, turn plates, and pull out pins on the turn plates.

Measuring Caster

8. Make sure front alignment heads are in the caster mode by pushing the center button to select between "caster" and "camber".
9. Starting with the driver side, turn the front wheel in to 20 degrees and level the alignment head, and press zero or click "Next" on the software.
10. Turn the front wheel 20 degrees out from the car, level the alignment head, and click "Record" to save the resulting caster number.
11. Repeat steps 5 and 6 for passenger side.
12. Make caster adjustments as needed and repeat steps 5-7 to record the after measurements.
13. Also refer to information below for measuring caster.

Measuring Camber

14. Turn "on" all alignment heads and make sure they are in the "camber" mode.
15. Level all alignment heads and click "Record" to save the resulting camber numbers.
16. Make camber adjustments as needed and repeat steps 10-11 to record the after measurements.
17. Also refer to information below for measuring camber.

Measuring Rear Toe

18. Make sure rear spacers are installed on the rear rim clamps and are snug between the rim clamp plate and the rim clamp.
19. Turn "on" the left front track width laser and turn the front wheels until the left front track width laser is lined up on the zero mark on the right front track width laser ruler.
20. Turn "on" the left front alignment head and laser. Then using the left front laser, read the left rear toe by taking the measurement from the back ruler and subtract that measurement by the front ruler measurement. This equation can be done using the software by selecting the toe box of the wheel that you are reading and input values for the back toe ruler and the front tow ruler in their boxes on the bottom of the screen. A negative number means toe-out and a positive number means toe-in.
21. Using the front left laser, read where the laser is on the left rear alignment head ruler. This is measuring the difference in offset from front to rear. (Example: if the ruler on the left rear reads ¼ inch to the right of the zero mark or away from the car that indicates the front left wheel is a ¼ inch wider on that side.)
22. Move the front left alignment head ruler to reflect what was read on the left rear alignment head ruler, but in the opposite direction of the rear ruler.
23. Make adjustments to the rear toe as needed.
24. Repeat steps 13-17 for the right side. Do not click "Record All" until all before measurements for toe have been taken.

Measuring Front Toe

25. Turn "on" the left rear laser and remove rear rim clamp spacers.
26. Use the three knobs to adjust the laser so that the laser line is lined up on the zero mark on the left front alignment head ruler.
27. Read the front toe by taking the measurement from the back ruler and subtract it by the front ruler measurement. This equation can be done using the Intercomp Software by selecting the toe box of the wheel that you are reading and input values for the back toe ruler and the front toe ruler in their boxes on the bottom of the screen.
28. Repeat steps 19-21 for the right side. Click "Record All once all before measurements for toe have been taken.
29. Make adjustments to the front toe as needed. Click "Record All" once the after toe measurements have been taken and are within spec.
30. Click "Save" once the alignment is complete.
31. To load previous alignments click file, then click "Load Alignment" and then you can search for the previous alignment using the VIN, Customer Name, or Repair Order. It order to search using one of those three names, that information must be added before the alignment begins.

Alignment Gauge Operations

On/Off

Turns the Alignment Gauge on and off. This gauge has an auto-off feature. If there is no motion or keys pressed for 1 hour, the Alignment Gauge automatically power down.

Caster/Camber

This key is used to toggle between caster, camber, and the inclinometer modes. Note: The Alignment Gauge will power up in the mode it was last in.

Zero

Press this key to obtain a new zero point. Zero is only active while in caster or inclinometer mode. The Alignment Gauge will power up in the mode it was last in.

Caster Mode

If the gauge is going into caster mode the display will show "CASt" for a couple of seconds and then display the caster angle. Make sure the gauge is in the correct mode for the procedure you are performing (I.E. 15 Degree Caster function).

Camber Mode

If the gauge is going into camber mode the display will show "CbEr" for a couple of seconds and then display the camber angle.

Inclinometer Mode

If the gauge is going into inclinometer mode, the display will show "inCL" for a couple of seconds and then display the inclinometer angle. The inclinometer mode allows for reading in true degrees (like camber) but has the ability to zero.

Mode Menu

Press the ZERO and CAS/CAM buttons to the access the Mode menu. The display will show "LitE". Use the Zero key to cycle through the Menu Parameters until the desired function appears. Upon cycling through all functions, the active reading will be displayed. Simply press Zero and CAS/CAM buttons again to return to the menu.

At times it will be necessary to enter up to a four digit number. When this is necessary the current number will be displayed with the right most digit flashing. The flashing digit may be incremented by pressing the CAS/CAM button. To move one digit to the left, press the ZERO key. When you have finished entering a number press the ZERO and CAS/CAM buttons. The settings are saved once ZERO and CAS/CAM buttons are pressed to advance the menu, and the inclinometer can then be turned off.

| Step | Function | Note | Default |
|------|----------|------|---------|
| LitE | Backlight | Toggles backlight On/Off | |
| 20.15 | Caster swing selection | 15.5 or 20.20 | 20.20 |
| Prnt | Print | Prints one line | |
| ZEro | Reset permanent zero for camber and inclinometer | Hold stable while level Rotatte 180 deg and hold stable | LL00 LL01 |
| A.off | Auto Off | 000 = off, 1 to 240 minutes | 060 |
| Prt.t | Print Mode | Prnt = demand print, COnt = Continuous. | Prnt |
| bAUd | Printer baud rate | 1200, 2400, 4800, 9600, 19.2k, 38.4k, 57.6k, or 115k | 9600 |

Backlight

Press the ZERO and CASTER/CAMBER keys simultaneously to enter into the Mode Menu. Press the CASTER/CAMBER key to toggle the backlight on. Repeat the above process to turn the backlight off.

15 Degree Caster

Press the ZERO and CASTER/CAMBER keys simultaneously to enter into the Mode Menu. Press the ZERO key until the display reads "20.15". Press the CASTER/CAMBER key. The current mode will be blinking. Press the CASTER/CAMBER to toggle between "20.20" or "15.15". "20.20" is a +20° to −20° sweep (40° degrees) and "15.15", is a +15° to −15° sweep (30° total degrees). To save the setting, simultaneously press the ZERO and CASTER/CAMBER keys. The display will return to the mode menu.

Zero

Reset the permanent zero for camber mode or inclinometer mode. See also "Zero Set Adjustment" below.

Auto-Off

The auto off time is how long the scale will remain on without any activity (a key being pressed or a change in weight). To adjust the auto-off time: Press the ZERO and CASTER/CAMBER keys simultaneously to enter into the Mode Menu. Press Zero until the display reads "A.oFF". Press the CASTER/CAMBER key and release. Enter the auto-off time (in minutes). To deactivate auto-off, enter 0. The maximum time is 240 minutes. Simultaneously press Zero and CAST/CAMBER keys to save, the display will return to Mode menu.

Alignment Gauge Operating Instructions

1. Remove wheel bearing nut, if necessary, install gauge and hand tighten (or attach magnet adapter if no magnets). Make sure wheel is centered. Turn power on.

2. Read Camber:

Level the gauge by centering the bubble in the leveling vial, set Camber/Caster switch to Camber. Record the reading in the display window 3. Read Caster:
  a. Set Camber/Caster switch to Caster.
  b. Turn the spindle 20° (or 15° in 15 Degree Caster) forward from center (turn right if on left, turn left if on right)
  c. Level the gauge with the leveling vial
  d. Adjust display to zero by pressing the ZERO key
  e. Move spindle back to center, then 20° (or 15° in 15 Degree Caster) rearward
  f. Re-level the gauge
  g. Record reading on display.

4. Turn off power and remove gauge.

Zero Set Adjust

This is a periodic requirement for the gauge determined be the usage of the gage. It is recommended that this be performed monthly. This is different than the temporary vaster zero set by pressing the ZERO key. Performing this operation takes 2 readings, and it will recalibrate the camber zero reference point. This procedure must be performed on a flat surface, but the surface does not have to be level. If the unit has the 3 inch magnet, it must be removed so the Caster Camber Gauge can sit flat. Use a ³⁄₁₆ hex key to remove the screw holding the magnet in place.

To reset camber zero: Simultaneously press the ZERO and CASTER/CAMBER keys. Press ZERO until the display read "ZEr0". At this time, press the ZERO and CAS/CAM keys together again. The display will read "LL.00". With your gauge settled on a flat surface, press the ZERO and CASTER/CAMBER keys together. The display will read "HoLd" for a few seconds while the gauge is taking the reading and the display will then show "LL.01". Pick up the gauge, turn it 180° around, and place it back in the same exact spot, except that it faces the opposite direction. Wait a few seconds, and press the ZERO and CASTER/CAMBER keys again. The display will read "HoLd" for a few seconds and the Alignment Gauge will save the information and return to normal mode. Replace the magnet if it was removed.

Alignment Gauge Error Codes

In the Table Below, Error messages are displayed in priority order:

| Message | Meaning |
|---------|---------|
| 'EEPE' | EEPROM FAILURE Calibration information lost or corrupted Calibration information is held in a special permanent memory area. A checksum code is generated and written to this memory during the calibration process. Each time the power is turned on this code is regenerated and compared to the stored value. If a change is found this error message is displayed. |

-continued

| Message | Meaning |
|---|---|
| | Recalibration may clear the error display, but if the problem persists the control panel will have to be replaced. |
| 'Rd 1' | A/D converter failure |
| | The A/D circuit board has indicated a fault and needs to be repaired or replaced. |
| 'LCb 1' | Power-up Self Test has detected an angle sensor error |
| | The angle sensor may have failed or there is a bad connection. If the sensor resistance cheeks are good then the A/D circuit board has indicated a fault and needs to be repaired or replaced. |
| 'LC 1' | Run-time checking has detected an angle sensor error |
| | The angle sensor circuit may have failed or there is a bad connection. If the sensor resistance checks are good then the A/D circuit board has indicated a fault and needs to be repaired or replaced. |
| 'L.bAt' | Low battery voltage |
| | This message displayed intermittently indicates that the control panel has measured the battery voltage and found it to be too low. The most likely cause is that the batteries may need to be changed. If a new set of batteries fail to correct the situation, then the control panel may heed to be replaced, Also check the battery holder and wiring. |
| 'CAP' | Overload or calibration information lost or bad angle sensor |
| | The control panel has detected an angle reading that is larger than expected. If setting the unit on a flat surface does not clear the error attempt to recalibrate the unit. If this does not clear the problem then replace the angle sensor or control panel |
| 'ZErO' | Zero Range Error |
| | Inclinometer tried to zero off an angle outside the range specified in the zero range setting. Level the unit and press zero. |
| 'HEld' | Key is held down |
| | If this message is displayed with no key pressed examine the key pad and key pad connector ribbon. |

Changing the Batteries

Alignment Gauge:

Turn off the laser by pressing the ON/OFF push button switch. Press in the small notch of the 9V battery door and pull it outward. Replace the 9V battery while observing polarity. Insert the battery door with battery back into the holder until you hear or feel a click.

Track Width Laser:

Turn off the laser by pressing the ON/OFF push button switch. Remove the 4 screws on top of the enclosure. Carefully shift the switch wire assembly so that it is out of the way. Remove the 3 AA batteries and replace with new 3 AA batteries while noting the polarity markings on the battery holder. Put the switch/lid assembly back into place and fasten with the 4 screws.

Digital Turn Plate Operations

Controls

On/Off

Press this button to turn the unit on. When the Turn Plate has completed the 'self test' successfully, the turn plate will display an angular displacement of 0°. Press this button again to turn the unit off.

Zero

Tells the turn plate to display zero degrees. The user should zero the turn plate in this fashion before turning the wheels to their desired positions for caster or Ackerman measurement.

Backlight

Press this key to toggle the backlight on and off.

Direction Indicator

The display will show positive numbers when the plate is turned clockwise. It will show negative numbers (indicated by a '−' minus sign) when the plate is turned counterclockwise.

Changing the Battery

1. Turn the unit off.
2. Using a Philips head screwdriver, remove the two screws holding the battery plate which is directly to the right of the display.
3. Remove the plate and slide the battery out of it's compartment. Replace the battery with a new alkaline 9V battery.
4. Replace the battery cover plate.

User Recommendations

Measuring Caster

When measuring caster, it is important to turn the wheel equidistant both fore and aft. For example, if the wheel is turned 15° left from the straight position, it should then be turned 15° right from the straight position. Turning the wheel 15° one direction, then 20° the other will give a false caster reading.

Measuring Ackerman

Ackerman is the relationship of the turning ratios between the two front tires. The left front tire on a circle track car for example, will generally turn quicker than the right front tire. When the left front is turned 10°, the right front may only turn 8°. This is because the insider tire is tracking on a tighter radius circle than the right front, so it needs to turn more to reduce scrub.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An electronic alignment system for measuring caster and camber of the front wheels of a vehicle, comprising:
   a four digital alignment heads, each alignment head adapted to being associated with one of the four wheels of a vehicle, each alignment head including:
      i a control circuit including a display, an on/off selector, and a caster/camber mode selector,
      ii an electronic tilt sensor communicatively connected to the control circuit,
      iii a power supply communicatively connected to the control circuit board,
      iv a laser communicatively connected to the power supply arranged so that it is adapted to be pointed directly to an adjacent alignment head, and v a target ruler, the target being alignable with respect to a laser of an adjacent alignment head;
b a rim clamp for communicatively coupling each alignment head to the wheel of the vehicle;
c two turn plates, each turn plate adapted to be positioned below a front wheel of the vehicle, each turn plate showing the turn angle of a front wheel during caster measurement;
d wherein caster is measured on a front wheel by selecting a caster mode on an alignment head coupled to the wheel, turning the front wheel a predetermined angle inwardly as measured by a turn plate under the wheel, leveling the alignment head as indicated by the display receiving information from the tilt sensor, and recording a first caster angle, turning the front wheel a predetermined angle outwardly as measured by the turn plate, leveling the alignment head as indicated by the display receiving information from the tilt sensor, and recording a second caster angle; and
e wherein camber is measured on all wheels by selecting a camber mode on the alignment heads coupled to each of the four wheels, leveling each alignment head as indicated by the display receiving information from the tilt sensor of each alignment head, and recording a camber angle from each.

2. The alignment system of claim 1 for further measuring rear toe, wherein rear toe is measured on a rear wheel of one side of a vehicle by powering the laser of an alignment head coupled to the front wheel of the one side of the vehicle and recording a value from the target of an alignment head coupled to the rear wheel upon which toe is being measured.

3. The alignment system of claim 1, further comprising:
a a vehicle alignment control software disposed on a computer including a transmitter/receiver; and
b wherein each alignment head further comprises a transmitter/receiver for transmitting caster and camber angle information to the control software, and for receiving information from the control software.

* * * * *